(12) United States Patent
Vollmer (10) Patent No.: US 12,261,499 B2
(45) Date of Patent: Mar. 25, 2025

(54) MECHANICAL DEVICE FOR CONVERTING DIRECT CURRENT INTO ALTERNATING CURRENT

(71) Applicant: Siemens Aktiengesellschaft, Munich (DE)

(72) Inventor: Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 111 days.

(21) Appl. No.: 17/800,710

(22) PCT Filed: Jan. 11, 2021

(86) PCT No.: PCT/EP2021/050352
§ 371 (c)(1),
(2) Date: Aug. 18, 2022

(87) PCT Pub. No.: WO2021/164952
PCT Pub. Date: Aug. 26, 2021

(65) Prior Publication Data
US 2023/0353065 A1  Nov. 2, 2023

(30) Foreign Application Priority Data
Feb. 20, 2020  (EP) ................... 20158538

(51) Int. Cl.
*H02K 47/02* (2006.01)
(52) U.S. Cl.
CPC .................. *H02K 47/02* (2013.01)
(58) Field of Classification Search
CPC .. H02M 7/56; H02M 7/60; C12Q 1/00; C12Q 1/6816; C12Q 2563/107; C12Q 2565/113;
(Continued)

(56) References Cited

U.S. PATENT DOCUMENTS 1,810,379 A   6/1931  Urbinati
5,363,792 A   11/1994 Petechik
(Continued)

FOREIGN PATENT DOCUMENTS

CN   105515312 A   4/2016
CN   110168908 A   8/2019
(Continued)

OTHER PUBLICATIONS

*PCT International Search Report and Written Opinion of International Searching Authority mailed May 10, 2022 corresponding to PCT International Application No. PCT/EP2021/050352 filed Jan. 11, 2021.*

*Primary Examiner* — Naishadh N Desai
(74) *Attorney, Agent, or Firm* — Henry M. Feiereisen LLC (57) ABSTRACT

A mechanical device for converting direct current into three-phase alternating current includes a contact unit having at least two receiving regions for receiving electrical energy as direct current and at least three output regions for outputting electrical energy as alternating current. A first receiving region contacts a positive pole of a direct current feed. A second receiving region contacts a negative pole of the direct current feed. A first output region provides a first alternating current, a second output region provides a second alternating current, and a third output region provides a third alternating current. A contacting unit receives the direct current and/or outputs the alternating current, and an assembly provides contact of the output regions with three phases of a dynamoelectric rotating machine. An isolator between two of the output regions and the contact prevents the contact from making contact with the two output regions at a same time.

20 Claims, 5 Drawing Sheets

(58) Field of Classification Search
CPC .. C12Q 2565/501; H02K 47/02; H02K 47/00; H02K 47/04; H02K 47/06
See application file for complete search history.

(56) References Cited

U.S. PATENT DOCUMENTS

| | | | |
|---|---|---|---|
| 5,633,792 A * | 5/1997 | Massey | H02M 7/60 363/109 |
| 2009/0319529 A1 | 12/2009 | Bartlett et al. | |
| 2011/0044078 A1* | 2/2011 | Pardo | H02M 7/60 363/102 |
| 2012/0218684 A1 | 8/2012 | Andersen | |
| 2012/0294716 A1* | 11/2012 | Roesmann | H02P 25/024 416/1 |
| 2013/0234505 A1 | 9/2013 | Matsuda | |

FOREIGN PATENT DOCUMENTS

| | | |
|---|---|---|
| CN | 1455511 A | 11/2023 |
| WO | WO 2008144721 A2 | 11/2008 |
| WO | WO 2011/061233 A2 | 5/2011 |

* cited by examiner

MECHANICAL DEVICE FOR CONVERTING DIRECT CURRENT INTO ALTERNATING CURRENT

CROSS-REFERENCES TO RELATED APPLICATIONS

This application is the U.S. National Stage of International Application No. PCT/EP2021/050352, filed Jan. 11, 2021, which designated the United States and has been published as International Publication No. WO 2021/164952 A1 and which claims the priority of European Patent Application, Ser. No. 20/158,538.7, filed Feb. 20, 2020, pursuant to 35 U.S.C. 119 (a)-(d).

BACKGROUND OF THE INVENTION

The invention relates to a mechanical device for converting direct current into three-phase alternating current for driving a dynamoelectric rotating machine.

Furthermore, the invention relates to a dynamoelectric rotating machine with a mechanical device of this type.

Direct voltage networks are enjoying greater popularity in industrial networks. A power supply with direct current offers an enormous savings potential and is suited in particular to drives in production. For the most part only a direct voltage is also available in vehicles, robots, exoskeletons and other battery networks.

Electronic circuits which generate a multi-phase alternating voltage from a direct voltage are used in order to be able to operate a dynamoelectric rotating machine with a multi-phase stator winding in a direct voltage network, also referred to as DC network. This enables a multistrand winding to be fed to the dynamoelectric rotating machine. Electronic circuits of this type are particularly complicated and lossy.

Since electronic circuits of this type moreover have a certain complexity, the object underlying the invention is to reduce the complexity when the direct current is converted into three-phase alternating current for driving a dynamoelectric rotating machine.

SUMMARY OF THE INVENTION

The object is achieved by a mechanical device for converting direct current into three-phase alternating current for driving a dynamoelectric rotating machine, having at least one contact unit with at least two receiving regions for receiving electrical energy in the form of direct current and having at least three output regions for outputting electrical energy in the form of alternating current, wherein a first receiving region is embodied for contacting a positive terminal of a direct current feed, wherein a second receiving region is designed for contacting a negative terminal of a direct current feed, wherein a first output region is embodied to provide a first alternating current, wherein a second output region is embodied to provide a second alternating current, wherein a third output region is embodied to provide a third alternating current and at least one contacting unit for receiving the direct current and/or for outputting the alternating current.

Furthermore, the object is achieved by a dynamoelectric rotating machine with a mechanical device of this type.

A dynamoelectric rotating machine has a rotor and a stator.

The invention can be applied to both permanently excited or electrically excited synchronous machines and also to reluctance machines.

Further advantageous embodiments are contained in the subclaims.

In an advantageous embodiment of the invention, the contact unit can be attached to a shaft of a dynamoelectric rotating machine.

This is advantageous in that an existing dynamoelectric rotating machine can be used with a multistrand, in particular three-strand, stator winding, since the mechanical device is embodied to be easily attachable to the shaft.

In a further advantageous embodiment of the invention, the mechanical device is embodied as a hollow cylinder.

This is advantageous in that the mechanical device can be embodied to be attachable to the shaft on the one hand and can be adapted to dimensions of the dynamoelectric rotating machine on the other hand.

In a further advantageous embodiment of the invention, the first and/or the second receiving region is disposed on at least one slideway arranged at least substantially concentrically about a center point.

This is advantageous since as a result the receiving of electrical energy is associated with a rotation of the rotor.

In a further advantageous embodiment of the invention, the first and/or the second and/or the third output region is disposed on at least one slideway arranged at least substantially concentrically about the center point.

This is advantageous since as a result the output of electrical energy is associated with a rotation of the rotor.

In a further advantageous embodiment of the invention, the contact unit is embodied as a disc.

This occasionally offers the advantage of a compact design of the dynamoelectric rotating machine.

In a further advantageous embodiment of the invention, the first output region is disposed on a first slideway, the second output region on a second slideway and the third output region on a third slideway.

In a further advantageous embodiment of the invention, the first and the second receiving region are disposed on precisely one fourth slideway, wherein the first receiving region is disposed on a first section of the fourth slideway, wherein the second receiving region is disposed on a second section of the fourth slideway.

The sections, in particular one section size, are advantageously dependent on a pole number p of the machine.

By way of example $\alpha=120°/p$ can be indicated.

The device described is preferably embodied as a sliding contact switch.

In a further advantageous embodiment of the invention, the contacting unit is embodied for connection with the shaft of the dynamoelectric rotating machine and has at least three contacting elements, wherein during rotation of the shaft of the first slideway a first contacting element is embodied as follows so that the first contacting element connects the first output region with the first receiving region and with the second receiving region alternately, wherein during rotation of the shaft of the second slideway a second contacting element is embodied as follows so that the second contacting element connects the second output region with the first receiving region and with the second receiving region alternately, wherein during rotation of the shaft of the third slideway a third contacting element is embodied as follows so that the third contacting element connects the third output region with the first receiving region and with the second receiving region alternately.

This is advantageous in that by means of this embodiment, the direct voltage is controlled by a rotor position and switched at a defined angle to the multistrand stator winding by way of the contacting elements.

By way of example, for an angle $\alpha_{mech}$ between two strands with a number of strands m: $\alpha_{mech}=\alpha_{el}/p$, wherein $\alpha_{el}=360°/m$.

By way of example, a number of sections is 2·p.

In a further advantageous embodiment of the invention, the first receiving region is disposed on a first receiving slideway, wherein the first receiving slideway is arranged on an outer periphery of the contact unit embodied as a hollow cylinder, wherein the second receiving region is disposed on a second receiving slideway, wherein the second receiving slideway is arranged on the outer periphery of the contact unit.

This is advantageous since as a result the receiving of electrical energy is associated with a rotation of the rotor.

In a further advantageous embodiment of the invention, the first output region and the second output region and the third output region is arranged on precisely one output slideway, wherein the output slideway is arranged on the outer periphery of the contact unit embodied as a hollow cylinder, wherein the first output region is disposed on the first section of the output slideway, wherein the second output region is disposed on a second section of the output slideway, wherein the third output region is disposed on a third section of the output slideway.

By way of example the sections indicate 120° electrically.

There are advantageously 3·p sections on the periphery.

One embodiment of this type is suited in particular to a reluctance machine.

For this purpose the rotor is designed as a reluctance rotor and thus has different magnetic conductance values in the d- and q-axis.

The direct current is preferably transmitted by way of stationary brushes to a commutator fastened to or on the rotor. There the current is transmitted in a correct position preferably via brushes to the stator winding. As a result, the machine does not require any rotor position sensor system.

This has the advantage that a reluctance machine can be operated directly on direct current networks. A machine with a robust rotor structure, compact dimensions and a cost-effective price can therefore be operated directly on a direct current system.

The reluctance machine has no windings on the rotor and preferably comprises stamped metal sheeting. As a result fewer losses occur on the rotor. With the reluctance machine there is a lower inertia and it is cost-effective. The robust structure also enables applications in the high-temperature range, i.e. in the case of fans for flue gas venting or fresh air overpressure in the event of a fire. In particular, with these applications, battery-buffered DC networks are preferably used. In such applications dispensing with converters on the one hand and position sensors in the machine on the other is advantageous.

In a further advantageous embodiment of the invention, the first output region is disposed on a first output slideway and the second output region is disposed on a second output slideway and the third output region is disposed on a third output slideway, wherein the first output slideway and the second output slideway and the third output slideway are configured on the outer periphery of the contact unit embodied as a hollow cylinder.

In a further advantageous embodiment of the invention, the first output region is subdivided into a plurality of output region sections, wherein the second output region is divided into the plurality of output region sections, wherein the third output region is subdivided into the plurality of output region sections.

In a further advantageous embodiment of the invention, the plurality of output region sections corresponds to a number of poles of a stator winding of the dynamoelectric rotating machine, wherein a first output region section is connected to the first receiving region, wherein an adjacent second output region section is connected to the second receiving region.

In this embodiment the mechanical device described preferably comprises at least one sliding contact for each phase and at least one sliding contact for each pole of the direct voltage, in other words with a machine with a three-phase stator winding at least five sliding contacts, preferably embodied as brushes.

The sliding contacts are preferably embodied as fixed brushes and the mechanical device rotates when the rotor rotates with the rotor. The fixed brushes are pressed with prestress onto the assigned receiving or output slideways, so that the current flow is ensured optimally.

In this embodiment, the mechanical device is preferably embodied to be twistable or adjustable with respect to the stator winding and/or the rotor, so that for the optimal rotor position the phases are fed with current. The optimal current feed into the multiphase stator winding is predetermined by the position of the fixed brushes and the arrangement of the slideways. E.g. with a three-phase stator winding the current is fed electrically offset by 120° C.

The invention is advantageous in that it is possible to dispense with a use of direct current machines. This brings about a good cooling of the rotor and thus of the machine, whereas with direct current machines the winding sits in the rotating machine part and as a result the rotor can be cooled less effectively. The invention moreover enables a higher speed performance than with direct current machines.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
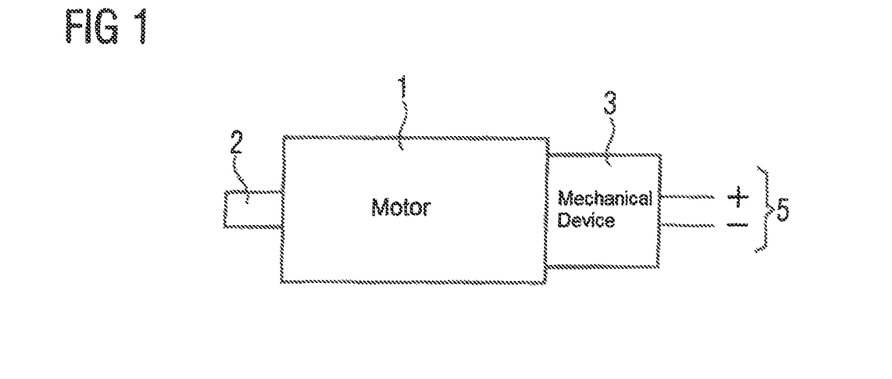
FIG. 1 shows a dynamoelectric rotating machine.

FIG. 1 shows a dynamoelectric rotating machine in the form of a motor.

The multistrand motor 1 is coupled to the inventive mechanical device 3. The mechanical device 3 is a sliding contact switch in FIG. 1, which is fed with direct current by means of the DC feed 5. In FIG. 1 both the motor 1 and also the sliding contact switch 3 are coupled to a shaft 2.

Figure 2:
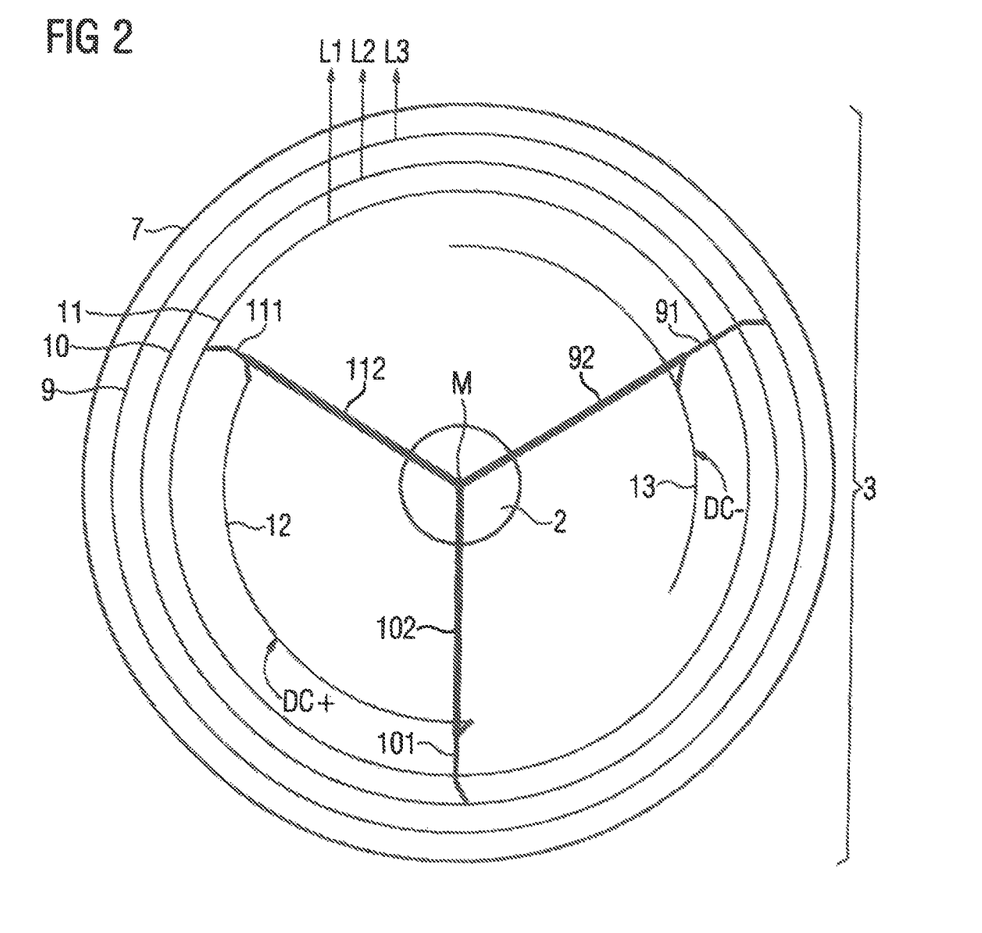
FIG. 2 shows a first embodiment of the mechanical device.

FIG. 2 shows a first embodiment of the mechanical device 3.

FIG. 2 shows the mechanical device 3 embodied as a disc or contact disc. The mechanical device 3 is suited for fixing on a stator of a dynamoelectric rotating machine.

The mechanical device 3 is embodied in FIG. 2 as a contact disc, wherein a contact disc is an embodiment of a hollow cylinder.

The mechanical device 3 has a first output region 9, a second output region 10 and a third output region 11. In FIG. 2, the first output region 9 is embodied as a slideway for a first phase L1, the second output region 10 is embodied as a slideway for a second phase L2 and the third output region 11 is embodied as a slideway for a third phase L3.

Furthermore, in FIG. 2 the mechanical device 3 comprises a first receiving region 12 and a second receiving region 13.

The two receiving regions 12 and 13 are disposed on precisely one slideway, which at least partially follows a circular path arranged concentrically about a center point M.

The first receiving region 12 is embodied for contacting a positive terminal of a DC feed. The second receiving region 13 is embodied for contacting a negative terminal of a DC feed.

The slideways 9, 10, 11 also at least partially follow a circular path arranged concentrically about a center point M.

FIG. 2 shows that the contact disc 7 is coupled to the shaft 2.

The contact disc 7 is preferably fixedly connected to the stator.

FIG. 2 further shows a connecting element 92, a connecting element 102 and a connecting element 112.

A contacting element 91 is connected to the connecting element 92. A contacting element 92 is connected to the connecting element 102. A contacting element 111 is connected to the connecting element 112.

The contacting elements 91, 101 and 111 can be connected to the shaft 2 by means of the connecting elements 92, 102 and 112.

When the shaft 2 is rotated, the contacting element 91 connects the output region 9 with the receiving region 13 and subsequently the output region 9 with the receiving region 12, for instance. In other words: the contacting element 91 connects the slideway for L1 with the negative terminal and subsequently the slideway for L1 with the positive terminal.

The following also applies: the contacting element 101 connects the slideway for L2 with the negative terminal and subsequently the slideway for L2 with the positive terminal. The contacting element 111 connects the slideway for L3 with the negative terminal and subsequently the slideway for L3 with the positive terminal.

The length of the receiving regions 12 and 13 on the slideway is selected so that a three-phase alternating current is formed.

A multistrand stator winding can be fed to a sliding contact switch by means of the mechanical device 3.

The connecting elements are preferably embodied as brushes, in particular carbon brushes.

As already mentioned, the contacts 91, 101 and 111 are connected to the shaft 2 by way of the connecting element and thus to the rotor.

If the receiving regions 12 and 13 are contacted with the direct voltage, a position of the rotor controls which output region can provide which current.

An output region can be embodied as a contact ring. A receiving region can be embodied as a commutation ring.

Figure 3:
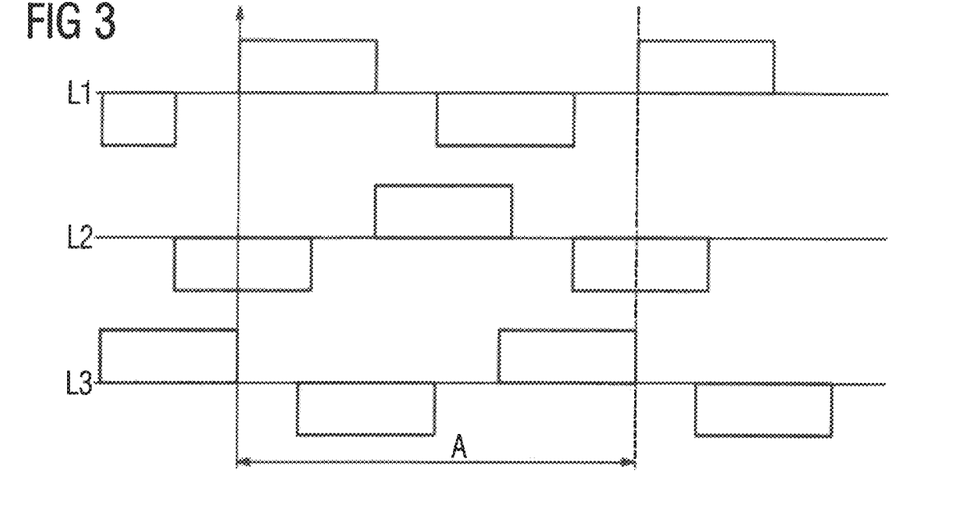
FIG. 3 shows a result of the conversion of direct current into three-phase alternating current.

FIG. 3 shows a result of the conversion of direct current into three-phase alternating current. FIG. 3 shows how a three-strand winding of a dynamoelectric rotating machine can be fed by the mechanical device 3 on the basis of a direct current feed.

FIG. 3 shows the feed of the three strands L1, L2 and L3, wherein A shows a rotation with a two-pole motor.

The figure shows that the positive current regions of the individual strands are phase-shifted about 120° C., as usual with a three-phase alternating current.

Figure 4:
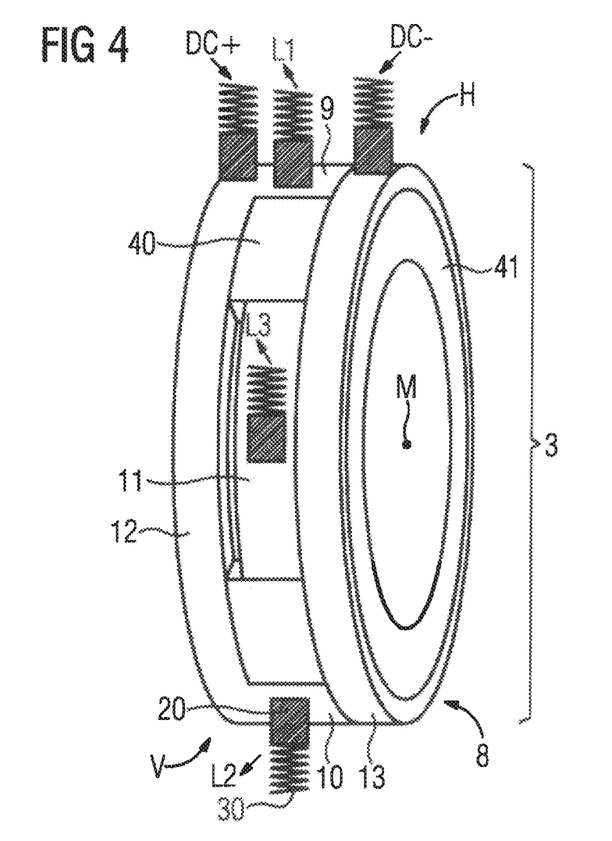
FIG. 4 shows a further embodiment of the mechanical device.

FIG. 4 shows a further embodiment of the mechanical device 3.

FIG. 4 shows a commutator with sliding contacts 8 which can be attached to a shaft. The mechanical device 3 is embodied as a hollow cylinder. The mechanical device 3 has a first receiving region for contacting a positive pole of a direct current feed 12 and a second receiving region for contacting a negative pole of a direct current feed 13.

In FIG. 4 the first receiving region is embodied on a front axial end V of the hollow cylinder as a path circulating on an outer periphery of the hollow cylinder. In FIG. 4 the second receiving region is embodied on a rear axial end H of the hollow cylinder as a path circulating on an outer periphery of the hollow cylinder.

Furthermore, FIG. 4 shows three output regions 9, 10 and 11, which are arranged offset mechanically about 60° C. on the periphery (60° mechanically corresponds to 180° electrically).

The output regions 9 and 10 are advantageously connected to DC+, the output region 11 to DC−.

FIG. 4 shows that each receiving region and each output region can be contacted by way of a contact 20 and a spring 30. The first receiving region 12 and the second receiving region 13 are connected to the feeding DC system by way of contact 20 and spring 30. This is shown in FIG. 4 with DC+ and DC−.

The three output regions 9, 10 and 11 can be contacted by way of spring 30 and contact 20 with the phases L1, L2 and L3 which represent the power supply of the motor.

FIG. 4 shows a mechanical device 3, which is suited to a three-strand dynamoelectric rotating machine with six poles.

Figure 5:
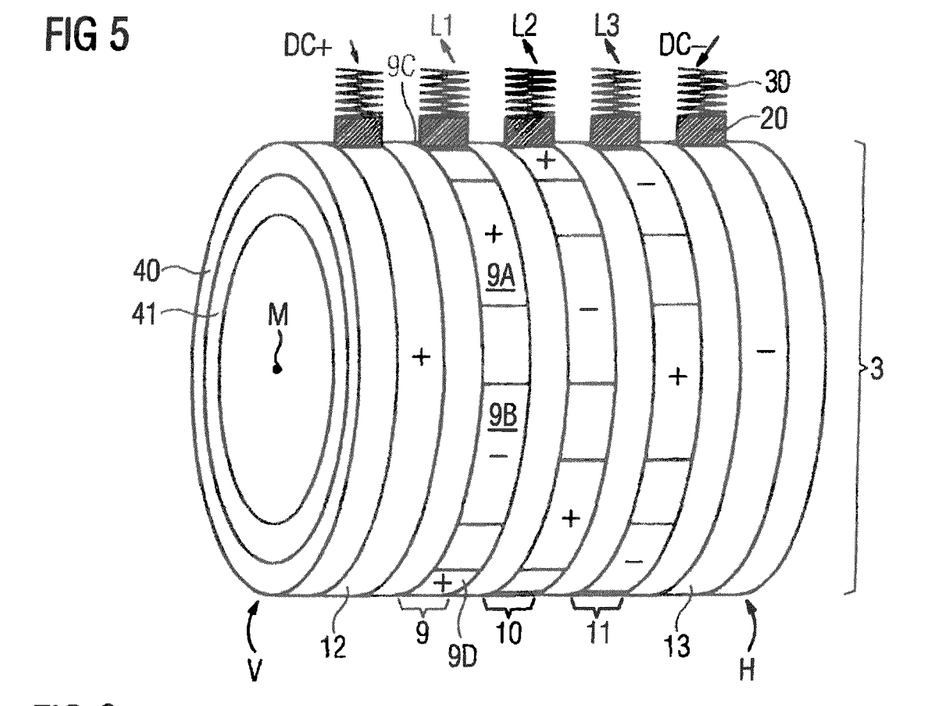
FIG. 5 shows a further embodiment of the mechanical device.

FIG. 5 shows a further embodiment of the mechanical device 3.

The mechanical device 3 is embodied as a hollow cylinder and can be coupled to a shaft of a dynamoelectric rotating machine by means of the shaft adapter 41. The mechanical device 3 is to be non-rotatably mounted during coupling with a shaft. FIG. 5 shows an isolator 40. Furthermore, FIG. 5 shows a first receiving region 12, a second receiving region 13 and three output regions 9, 10 and 11.

FIG. 5 shows that each receiving region and each output region can be contacted by way of a contact 20 and a spring 30. The first receiving region 12 and the second receiving region 13 are connected to the feeding DC system by way of contact 20 and spring 30. This is shown in FIG. 5 with DC+ and DC−.

FIG. 5 shows a mechanical device 3, which is suited to a three-strand dynamoelectric rotating machine with six poles.

In the figure the first output region 9 is subdivided into a plurality of output region sections. The second output region 10 is subdivided into the same plurality of output region sections. The third output region 11 is subdivided into the same plurality of output region sections.

The number of output region sections preferably corresponds to the number of poles of a stator winding of the dynamoelectric rotating machine, wherein a first output region section 9A is connected to the first receiving region 12, wherein an adjacent second output region section 9B is connected to the second receiving region 13. This is described more precisely in FIG. 6.

Figure 6:
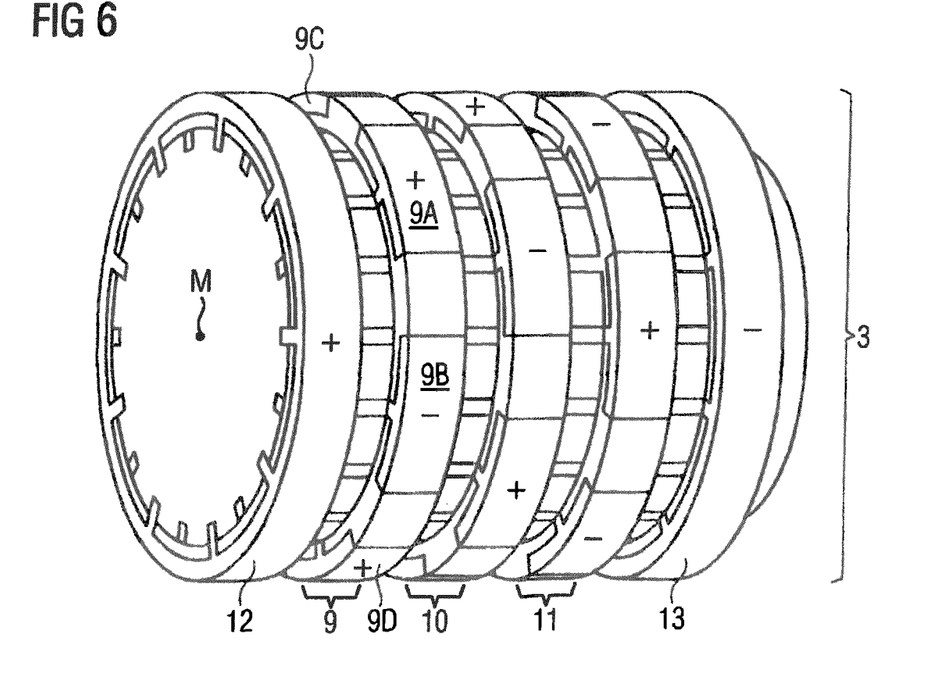
FIG. 6 shows an embodiment of an internal connection of the embodiment of the mechanical device shown in FIG. 5.

FIG. 6 shows an embodiment of an internal connection of the embodiment of the mechanical device shown in FIG. 5.

The first output region section 9A is connected to the first receiving region 12, the adjacent second output region section 9B is connected to the second receiving region 13. A further adjacent third output region section 9C is likewise connected to the second receiving region 13.

In the figure, an output region section 9D is connected to the first receiving region 12. This system is transferred to the other two slideways.

Figure 7:
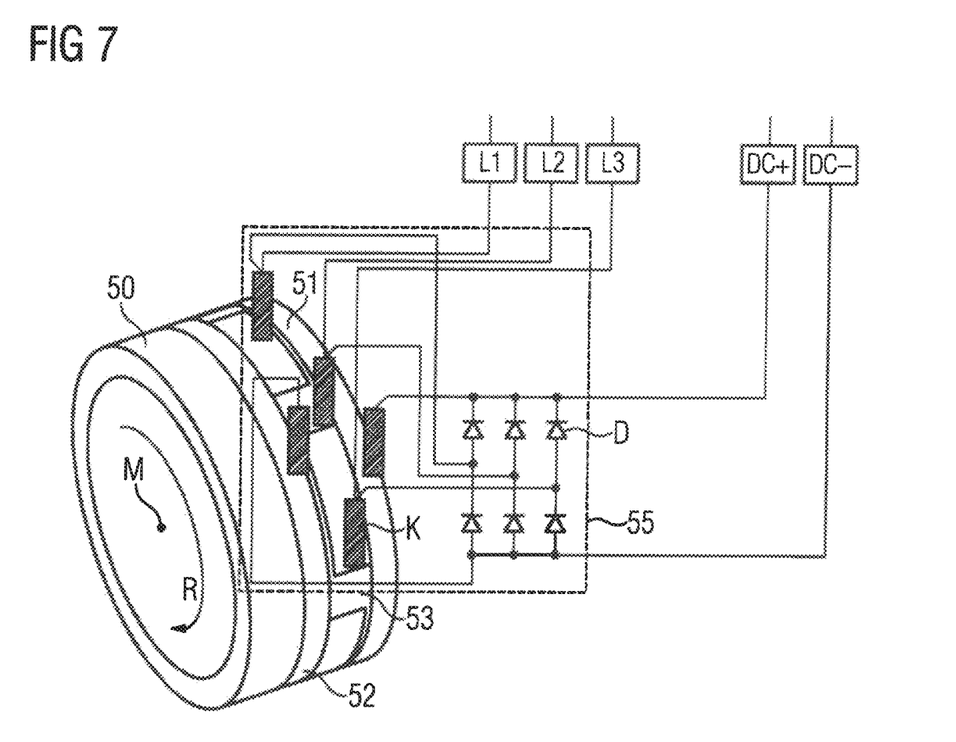
FIG. 7 shows a device for suppressing brush sparking with a high current load.

FIG. 7 shows a device for suppressing brush sparking with a high current load.

In various exemplary embodiments the mechanical device described in the preceding figures can develop brush sparking with a high current load. Brush sparking of this type is largely to be suppressed.

FIG. 7 shows an insulation body 50 and slideways 53, 52, 51 and a movement direction R. FIG. 7 shows a brush system 55, which has free-wheeling diodes D for suppressing brush sparking.

The figure further shows contacts K which are coupled to DC+ or DC− or L1, L2 or L3.

This is advantageous in that brush sparkings which result in a high wear, for instance, are suppressed. On account of the free-wheeling diodes D which are arranged in the brush system, free-wheeling currents can be derived without sparks developing.

Figure 8:
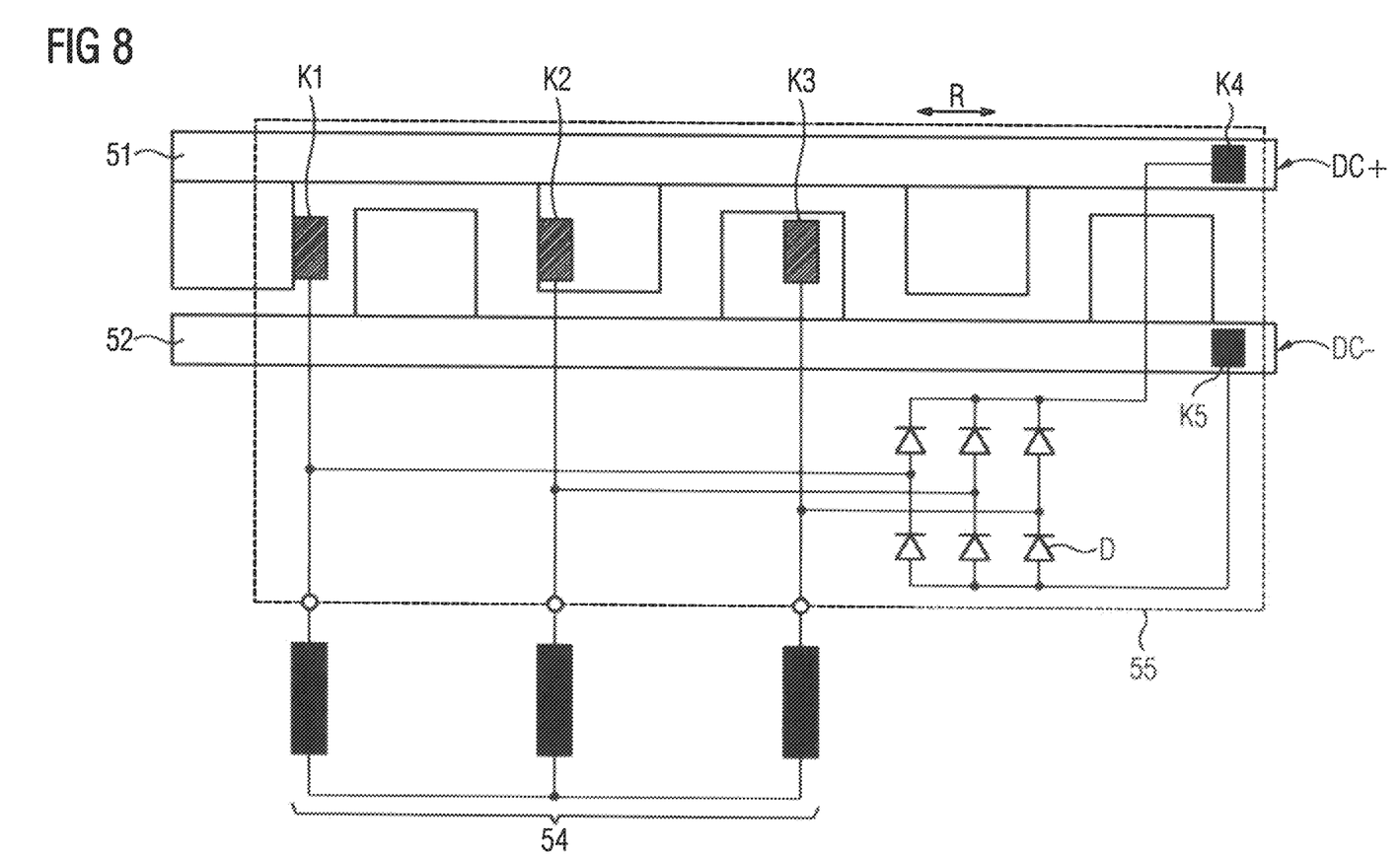
FIG. 8 shows the device from FIG. 7 in another perspective.

FIG. 8 shows the device from FIG. 7 in another perspective, a rolled-out perspective as it were.

FIG. 8 shows the slideways 53, 52 and 51, the brush system 55 and the free-wheeling diodes D for suppressing brush sparkings. The figure shows the stator winding in a star circuit 54 and an arrangement of the contacts K1 . . . K4.

The device is suited to a six pole, three-phase machine.

The invention claimed is:

1. A mechanical device for converting direct current into three-phase alternating current for driving a dynamoelectric rotating machine, said mechanical device comprising:
 a contact unit attachable to a shaft of the dynamoelectric rotating machine said contact unit including at least two receiving regions for receiving electrical energy in a form of direct current and at least three outout regions for outputting electrical energy in a form of alternating current, with a first one of the at least two receiving regions configured to contact a positive pole of a direct current feed, with a second one of the at least two receiving regions configured to contact a negative pole of the direct current feed, with a first one of the at least three output regions configured to provide a first alternating current with a second one of the at least three output regions configured to provide a second alternating current and with a third one of the at least three output regions configured to provide a third alternating current;
 a contacting unit for receiving the direct current and/or for outputting the alternating current;
 an assembly comprising a spring and a contact to provide contact of the at least three output regions with three phases of the dynamoelectric rotating machine; and
 an isolator embodied between two of the at least three output regions and the contact to prevent the contact from making contact with the two of the at least three output regions at a same time,
 wherein the first one of the at least three output regions is disposed on a first slideway, the second one of the at least three output regions is disposed on a second slideway, and the third one of the at least three output regions is disposed on a third slideway.

2. The mechanical device of claim 1, wherein the contact unit is embodied as a hollow cylinder.

3. The mechanical device of claim 1, wherein at least one the first and second receiving regions is disposed on a slideway arranged at least substantially concentrically about a center point.

4. The mechanical device of claim 1, wherein at least one of the first, second and third output regions is disposed on a slideway arranged at least substantially concentrically about a center point.

5. The mechanical device of claim 1, wherein the contact unit is embodied as a disc.

6. A mechanical device for converting direct current into three-phase alternating current for driving a dynamoelectric rotating machine, said mechanical device comprising:
 a contact unit attachable to a shaft of the dynamoelectric rotating machine, said contact unit embodied as a hollow cylinder and including at least two receiving regions for receiving electrical energy in a form of direct current and at least three output regions for outputting electrical energy in a form of alternating current, with a first one of the at least two receiving regions configured to contact a positive pole of a direct current feed, with a second one of the at least two receiving regions configured to contact a negative pole of the direct current feed, with a first one of the at least three output regions configured to provide a first alternating current, with a second one of the at least three output regions configured to provide a second alternating current, and with a third one of the at least three output regions configured to provide a third alternating current;
 a contacting unit for receiving the direct current and/or for outputting the alternating current;
 an assembly comprising a spring and a contact to provide contact of the at least three output regions with three phases of the dynamoelectric rotating machine; and
 an isolator embodied between two of the at least three output regions and the contact to prevent the contact from making contact with the two of the at least three output regions at a same time,
 wherein the first one of the at least two receiving regions is disposed on a first receiving slideway which is arranged on an outer periphery of the contact unit, and said second one of the at least two receiving regions is disposed on a second receiving slideway which is arranged on the outer periphery of the contact unit.

7. A mechanical device for converting direct current into three-phase alternating current for driving a dynamoelectric rotating machine, said mechanical device comprising:
 a contact unit attachable to a shaft of the dynamoelectric rotating machine, said contact unit embodied as a hollow cylinder and including at least two receiving regions for receiving electrical energy in a form of direct current and at least three output regions for outputting electrical energy in a form of alternating current, with a first one of the at least two receiving regions configured to contact a positive pole of a direct current feed, with a second one of the at least two receiving regions configured to contact a negative pole of the direct current feed, with a first one of the at least three output regions configured to provide a first alternating current. with a second one of the at least three output regions configured to provide a second alternating current and with a third one of the at least three output regions configured to provide a third alternating current;
a contacting unit for receiving the direct current and/or for outputting the alternating current;
an assembly comprising a spring and a contact to provide contact of the at least three output regions with three phases of the dynamoelectric rotating machine; and
an isolator embodied between two of the at least three output regions and the contact to prevent the contact from making contact with the two of the at least three output regions at a same time,
wherein the at least three output regions are disposed on precisely one output slideway which is arranged on an outer periphery of the contact unit, with the first one of the at least three output regions being disposed on a first section of the output slideway, with the second one of the at least three output regions being disposed on a second section of the output slideway, and with the third one of the at least three output regions being disposed on a third section of the output slideway.

8. A mechanical device for converting direct current into three-phase a alternating current for driving a dynamoelectric rotating machine, said mechanical device comprising:
a contact unit attachable to a shaft of the dynamoelectric rotating machine, said contact unit embodied as a hollow cylinder and including at least two receiving regions for receiving electrical energy in a form of direct current and at least three output regions for outputting electrical energy in a form of alternating current, with a first one of the at least two receiving regions configured to contact a positive pole of a direct current feed, with a second one of the at least two receiving regions configured to contact a negative pole of the direct current feed, with a first one of the at least three output regions configured to provide a first alternating current, with a second one of the at least three output regions configured to provide a second alternating current, and with a third one of the at least three output regions configured to provide a third alternating current;
a contacting unit for receiving the direct current and/or for outputting the alternating current;
an assembly comprising a spring and a contact to provide contact of the at least three output regions with three phases of the dynamoelectric rotating machine; and
an isolator embodied between two of the at least three output regions and the contact to prevent the contact from making contact with the two of the at least three output regions at a same time,
wherein the first one of the at least three output regions is disposed on a first output slideway, the second one of the at least three output regions is disposed on a second output slideway, and the third one of the at least three output regions is disposed on a third output slideway, the first, second and third output slideways being arranged on an outer periphery of the contact unit.

9. The mechanical device of claim 8, wherein the first one of the at least three output regions is subdivided into a plurality of output region sections, with the second one of the at least three output regions being subdivided into the plurality of output region sections, and with the third one of the at least three output regions being subdivided into the plurality of output region sections.

10. The mechanical device of claim 9, wherein the plurality of output region sections corresponds to a number of poles of a stator winding of the dynamoelectric rotating machine, with a first one of the plurality of output region sections being connected to the first one of the at least two receiving regions, and with an adjacent second one of the plurality of output region sections being connected to the second one of the at least two receiving regions.

11. A dynamoelectric rotating machine, comprising a mechanical device, said mechanical device comprising a contact unit attachable to a shaft of the dynamoelectric rotating machine, said contact unit including at least two receiving regions for receiving electrical energy in a form of direct current and at least three output regions for outputting electrical energy in a form of alternating current, with a first one of the at least two receiving regions configured to contact a positive pole of a direct current feed, with a second one of the at least two receiving regions configured to contact a negative pole of the direct current feed, with a first one of the at least three output regions configured to provide a first alternating current, with a second one of the at least three output regions configured to provide a second alternating current, and with a third one of the at least three output regions configured to provide a third alternating current, a contacting unit for receiving the direct current and/or for outputting the alternating current, an assembly comprising a spring and a contact to provide contact of the at least three output regions with three phases of the dynamoelectric rotating machine, and an isolator embodied between two of the at least three output regions and the contact to prevent the contact from making contact with the two of the at least three output regions at a same time,
wherein the first one of the at least three output regions is disposed on a first slideway, the second one of the at least three output regions is disposed on a second slideway, and the third one of the at least three output regions is disposed on a third slideway.

12. The mechanical device of claim 6, wherein at least one the first and second receiving regions is disposed on a slideway arranged at least substantially concentrically about a center point.

13. The mechanical device of claim 6, wherein at least one of the first, second and third output regions is disposed on a slideway arranged at least substantially concentrically about a center point.

14. The mechanical device of claim 6, wherein the contact unit is embodied as a disc.

15. The mechanical device of claim 7, wherein at least one the first and second receiving regions is disposed on a slideway arranged at least substantially concentrically about a center point.

16. The mechanical device of claim 7, wherein at least one of the first, second and third output regions is disposed on a slideway arranged at least substantially concentrically about a center point.

17. The mechanical device of claim 7, wherein the contact unit is embodied as a disc.

18. The mechanical device of claim 8, wherein at least one the first and second receiving regions is disposed on a slideway arranged at least substantially concentrically about a center point.

19. The mechanical device of claim 8, wherein at least one of the first, second and third output regions is disposed on a slideway arranged at least substantially concentrically about a center point.

20. The mechanical device of claim 8, wherein the contact unit is embodied as a disc.

\* \* \* \* \*

UNITED STATES PATENT AND TRADEMARK OFFICE
CERTIFICATE OF CORRECTION

PATENT NO. : 12,261,499 B2
APPLICATION NO. : 17/800710
DATED : March 25, 2025
INVENTOR(S) : Rolf Vollmer Page 1 of 1

It is certified that error appears in the above-identified patent and that said Letters Patent is hereby corrected as shown below:

In the Claims

In Column 7, Claim 1, Line 48: replace "outout" with the correct --output--

In Column 9, Claim 8, Line 28: delete "a" before "alternating".

Signed and Sealed this
Twenty-second Day of July, 2025

Coke Morgan Stewart
*Acting Director of the United States Patent and Trademark Office*